Dec. 12, 1939.   W. F. ZIMMERMANN   2,183,363
WORK TABLE
Filed March 24, 1939   2 Sheets-Sheet 1

INVENTOR
William F. Zimmermann
BY
Albert F. Nathan
ATTORNEY

Dec. 12, 1939.   W. F. ZIMMERMANN   2,183,363
WORK TABLE
Filed March 24, 1939   2 Sheets-Sheet 2
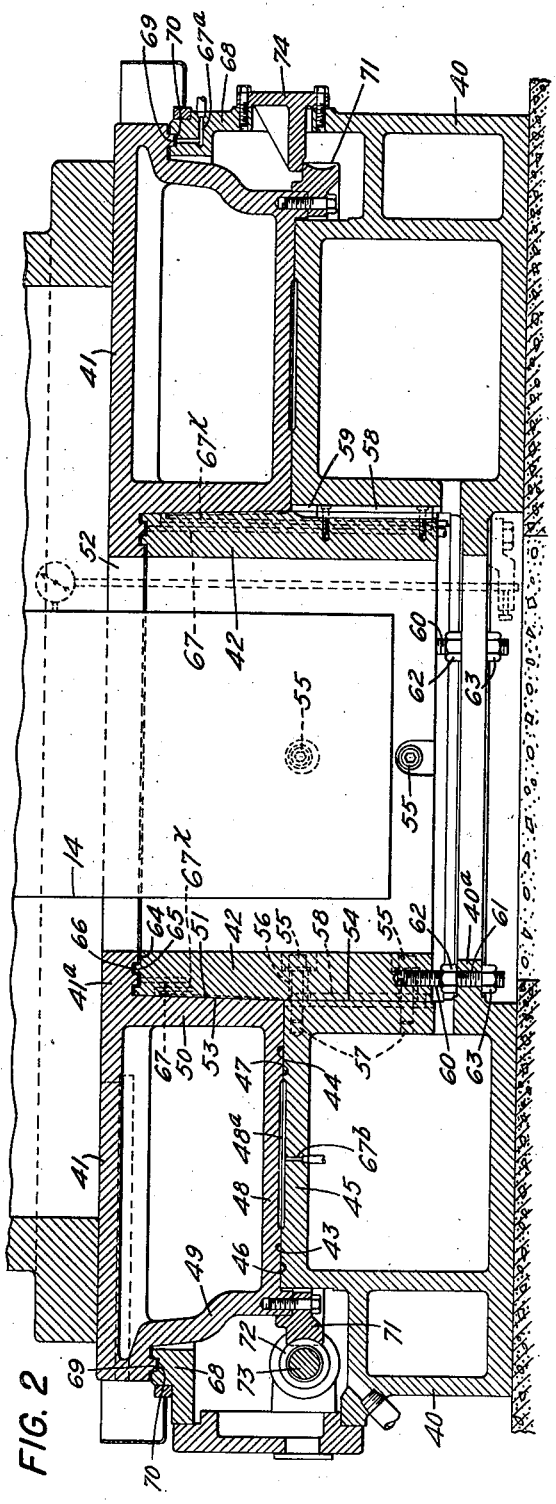
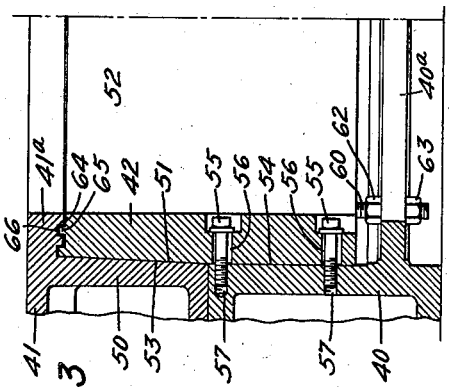
INVENTOR
William F. Zimmermann
BY
Albert F. Nathan
ATTORNEY Patented Dec. 12, 1939

2,183,363

UNITED STATES PATENT OFFICE 2,183,363

WORK TABLE

William F. Zimmermann, Maplewood, N. J., assignor to Gould & Eberhardt, Newark, N. J., a corporation of New Jersey Application March 24, 1939, Serial No. 263,883

8 Claims. (Cl. 90—58)

The present invention concerns a hobbing machine work table and relates particularly to an improved mounting for hollow work table whereby extreme accuracy in its revolutions about a central axis is attained and thereafter easily maintained.

An outstanding requirement of a gear hobbing machine is accuracy if one expects to produce quiet and true running gears. This requirement is still greater in the production of large high speed gears, and such gears cannot be cut true if the rotating table upon which they are mounted, runs out, for the errors that exist in the table are reproduced in the work. Such errors are particularly harmful in gears which are to run at a peripheral speed approximately 12,000 feet per minute, such as those used in marine turbine work.

Heretofore great difficulty was encountered in the manufacture of turbine gears because of their large diameter (3 to 12 feet or more) and their projecting integrally formed journals, which in some cases approximated two feet in diameter. The present invention proposes a table mounting adapted for such gears, by which the journal or axle of the gear may project into and through the table, if necessary. A large hole, therefore, must be provided in the table and all vertical and radial thrust bearings must be located well outside of the margins of the central hole. When the bearings of a rotating table are at, or close to the axis, no serious difficulties are presented. However, where, as in the present instance, the bearings must be approximately three feet or more in diameter and removed some distances from the geometrical axis a very different situation is encountered.

A primary aim of the invention is to render available a true running hollow table and a simplified mounting therefor wherein all of the vertical and laterally acting forces to which the table is subjected, are taken by relatively large bearing surfaces that may be easily machined and fitted to produce the accuracy required in a hobbing machine work table.

A further aim of the invention is to provide the work table mounting in which contiguous portions of the table top overlie the central pivotal support and bearing surfaces thereby to provide a strong one piece table structure capable of withstanding, without yielding, the maximum pressures to which it is subjected and in which the bearing surfaces are fully protected.

Still another object of the invention is to render available a rotatable table structure having a central hole therein of sufficient capacity to receive the journals, which may be of a size approximating two feet or more in diameter, or other projecting portions of gears to be hobbed. A table structure for coping with workpieces of such size and character, requires not only a massive, sturdy, construction but close fitting and yet freely operating bearings located an appreciable distance from the axis of rotation. The present invention aims further to provide a bearing means for a hollow table structure that may be easily and accurately manufactured and assembled to run true within the limits required in the manufacture of gear.

A further aim of the invention is to construct a rotary work table bearing mounting capable of subsequent adjustment for wear, in a simple manner. In the attainment of the objects of the invention it is proposed to construct the table mounting in the form of a large diametered tubular sleeve tapered on its external periphery to fit within a complementally tapered recess in the underside of the table in a manner whereby it may, by means accessible from within the large central hole therein, be accurately adjusted axially to produce the required close fit essential in this class of machine, and subsequently adjusted, in a similar manner, to compensate for such wear that takes place to maintain its original accuracy.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 2 is an enlarged sectional view of the work table illustrating a preferred form of sleeve bearing mounting.

Fig. 3 is a fragmentary sectional view more clearly illustrating a means for clamping the bearing sleeve in proper adjusted position.

Fig. 4 is a horizontal sectional view of one of the keys for guiding the sleeve axially and for restraining the sleeve from moving angularly relative to the base.

Figure 1:
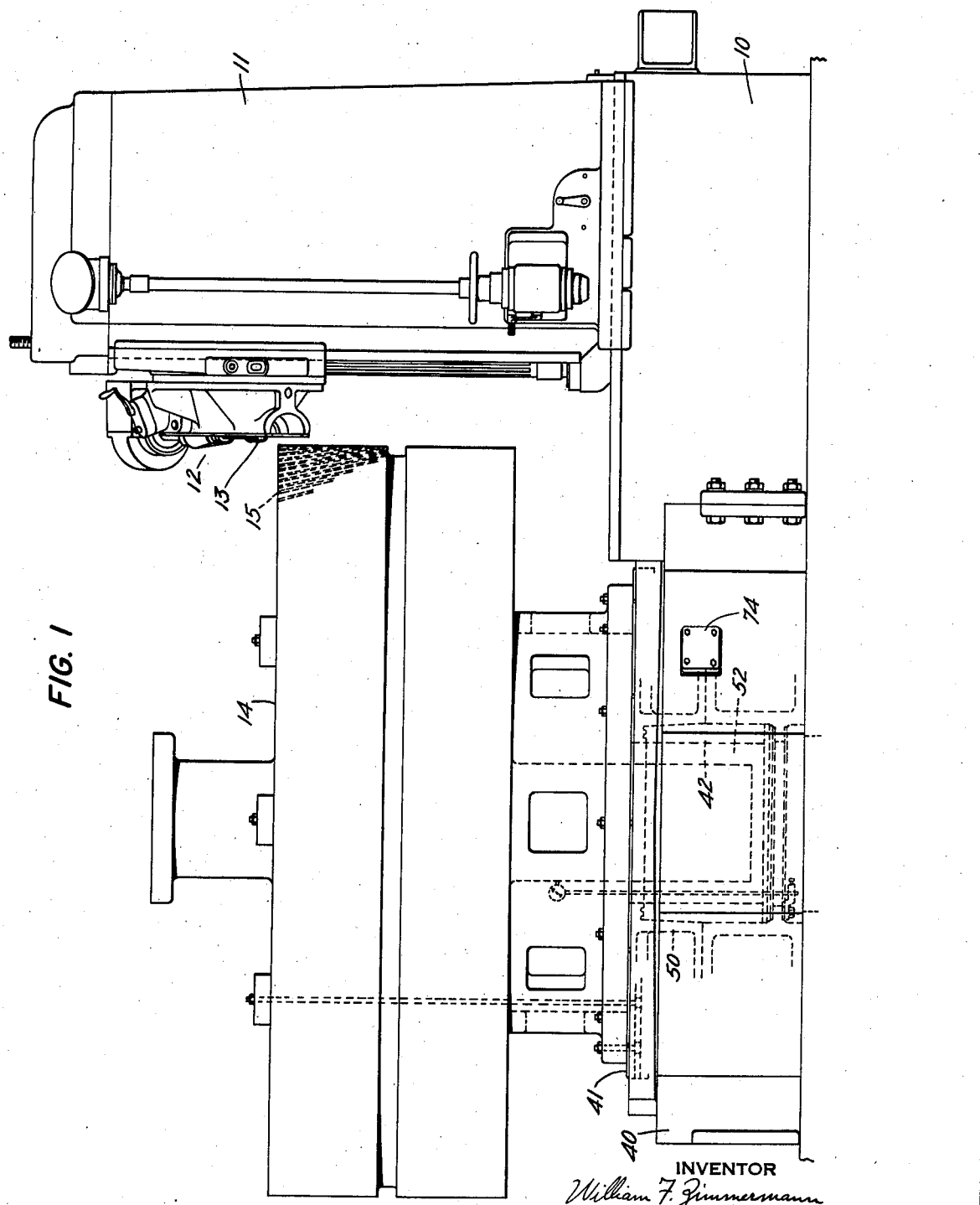
Figure 1 is a side elevation of a hobbing machine embodying the present invention.

Figure 1 of the drawings illustrates the invention embodied in a gear hobbing machine. Such machines include a base member 10 on which is adjustably mounted a cutter stanchion 11 and a cutter carriage 12 translatable upon ways at the front thereof. The carriage 12 supports a power driven hob 13 in cooperative relation with the periphery of the gear blank 14 mounted upon a rotatable table 41. The table is also power rotated, in synchronism with the movements of the hob 13, and as the table turns, and as the cutter carriage feeds slowly downward (from the position indicated in the drawing), gear teeth 15 are progressively cut around the periphery of the work blank.

The structural details of the table are disclosed more clearly in Figs. 2 to 4 and comprises three essential elements, a base member 40, a table proper 41 and a hollow axle 42. The base 40 is provided with flat annular bearing surfaces 43, 44 upon a reduced portion 45 thereof. Likewise, the table 41 is provided with complemental bearing surfaces 46 and 47 formed on the underside of a flange 48 that depends from the underside of the table intermediate its internal and external peripheries. The flange 48 supports the table through upstanding annular braces 49 and 50, the latter of which has its internal surface 51 accurately finished to provide the pivotal bearing surface for the rotary movements of the table.

As previously indicated the table structure has formed therein a relatively large central hole 52, which in the example given, is approximately ⅓ the diameter of the entire table. And in order to give increased strength and utility to the entire top surface of the work table, while at the same time afford adequate protection to the bearing surfaces, it is proposed to extend the table top completely over the annular top surface of the hollow axle 42, as indicated at 41ª.

The upper half of the hollow axle 42 is formed with a gentle taper on its external surface 53, which is complemental to the tapered bearing surface 51 formed in the overlaid portion of the table. The taper on the bearing surfaces should be as little as possible to give the best results as pivotal bearing and yet be sufficient to insure good fitting qualities with provision for subsequent adjustment for wear without necessitating too extensive a longitudinal or axial shift thereof. A taper that has been found to give good results is one in which the included angle is at the rate of one-half of an inch per foot, for such a taper is neither too slanted for a bearing nor too straight for convenient fitting and adjusting purposes.

The lower end of the hollow sleeve 42 is preferably cylindrical at its outer surface, and fits within the vertically arranged bore 54 provided by the framework of the base. The sleeve 42 is held firmly to the base in vertically adjusted position by means of a plurality of pairs of radially extending screws 55 (only one pair is illustrated in the drawings) which pass through elongated slots 56 in the sleeve and threaded into tapped holes 57 in the framework of the base. A plurality of keys 58 are secured to the external surface of the sleeve 42, at points preferably intermediate the sets of clamp screws 55, and project into slots 59 formed in the framework of the base and positively restrain the hollow axle from moving angularly while at the same time permitting axial adjustment thereof quite freely.

Appropriate means may be provided for adjusting the axle vertically thereby to increase or decrease the snugness of the fit of the tapered bearing 51, 53. One such means is illustrated in the drawings and consists of a plurality of studs 60 threaded tightly into the lower end of the sleeve. The projecting ends of the studs pass through holes 61 formed in an annular flange 40ª of the base underlying the sleeve and are provided at each side thereof with lock nuts 62 and 63. By progressively adjusting the lock nuts around the entire flange, the tubular sleeve 42 may be raised and lowered minute distances sufficient to vary the fit of the bearing as desired.

Other adjusting means may be provided. However, the stud arrangement proposed, lends itself readily adaptable to adjustment from the interior of the large central hole that extends through all of the members. Also, by adjusting the lock nuts predetermined part turns on studs of a known pitch, the extent of axial shift of the sleeve and thereby the closeness of the fit of the bearing may be accurately determined and regulated.

The present invention possesses the further advantage of extreme simplicity in design coupled with increased strength and rigidity throughout. With a tapered bearing of the herein disclosed character the vertical thrust bearings surfaces for the table may approach more closely to the inner peripheral edge of the table and also be of much greater total surface area for the same size table hole than can possibly be reached with other designs. A tapered bearing also is adaptable for convenient manufacture, for not only are there only two surfaces (the absolute minimum) to be machined, but being tapered they may be produced relatively inexpensively and fitted together far more easily than a multiplicity of true cylinders and concentric surfaces such as are necessary in the antifriction bearing design of mounting.

The accuracy and life of the tapered bearing depends largely upon proper lubrication and freedom from dirt, grit, or other foreign matter. In the present instance all of the bearing surfaces for the table are located underneath the top surface and well within the peripheral margins of the working surface. Contiguous portions of the table also overlies the top of the tubular sleeve 42, thus providing a cover and guard against the entry of foreign matter to the bearings.

With regard to the central portions of the table, the only point where dirt may enter the bearing is the lateral crevice 64 between the top of the tapered sleeve 42 and the underside of the overlying portion 41ª of the table top. An additional safeguard is provided at this region in the form of a series of interfitting annular ribs and grooves 65 and 66 formed in the top of the sleeve and in the underside of the table. These grooves form a series of reverse bends or baffles in the crevice 64 which effectively blocks the passageway and prevents dirt or other foreign matter from reaching the bearing surfaces. Provision is made for the axial shifting of the tapered sleeve 42 by constructing the grooves 66 slightly deeper than the annular tongues 65.

Lubricating conduits 67 leading preferably to the outer annular groove in the sleeve top are provided, through which lubricating material may be forced under pressure. The lubricant will force it way into the grooves and simultaneously eject such foreign matter as may tend to collect at the entrance end of the crevice 64. A separate lubricating system is provided for the tapered bearing surfaces 51—53 which comprises conduits 67ˣ (preferably three in number and equi-distantly spaced) leading to the upper end of the taper. By providing separate conduits there is little danger of fouling the surfaces of the tapered bearing by lubricant draining thereinto from the annular grooves at the top of the pintle.

The outer and under periphery of the table 41 is similarly interlocked with an annular upstanding portion 68 of the base by the ribs and channels 69 and 70. By this means, material that runs down the outer edges of the table is prevented from reaching the bearings or parts of the table propelling transmission located within the base.

The outer interlocking ribs and grooves 69 and 70 of the table are also adapted to be supplied with lubricant under pressure through one or more annularly spaced conduits 67ᵃ (only one of which is shown), which in addition to its lubricating function, seals the crevice and ejects to the outer side, dirt that may have collected therein. A similar lubricating principle is applied to the flat bearing surfaces 43, 44, 46, and 47. A conduit 67ᵇ conducts lubricating material under pressure to the annular space 48ᵃ located between the bearing surfaces, and keeps those surfaces well lubricated from within. It will be understood that while only one lubricating conduit 67, 67ᵃ and 67ᵇ is disclosed for the surfaces respectively associated therewith, that a number of such conduits may be provided at intervals about the machine as the size and need for additional conduits may require.

Rotary movements may be imparted to the table in a conventional way as by means of a worm gear 71 bolted or otherwise secured to the outer rim thereof, and a power driven worm 72 that meshes therewith. The worm 72 is mounted upon the shaft 73 which receives its power from the main transmission of the hobbing machine so that the table will be driven in synchronism with the movements of the hobbing cutter.

In the present design of table mounting, the massiveness of the structure which has added thereto the weight of the work fixture, work blank and the pressures of the cutting operation, which usually are downward, is considered adequate to hold the table down upon its bearing surfaces. However, in some hobbing operations the cut is in an upward direction, thus creating a tendency to lift the table. To prevent such lifting, bracket members 74 (only one of which is illustrated) are provided at spaced intervals about the base, and overlie a portion of the rotatable table, such as for example, the worm wheel 71. Any tendency of the table to lift and ride up on its cone bearing is thus positively restrained.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of the United States:

1. A hobbing machine work table comprising a hollow base member; a large diametered tubular sleeve secured centrally in said base and projecting upwardly therefrom, the outer periphery of said projecting portion being slightly tapered toward its upper end; annular guideways on said base member circumscribing said tubular sleeve; a rotatable table member mounted upon the guideways of said base, said table having a central hole formed therein and an axially tapered recess formed in its under surface adapted to receive the projecting tapered end of said sleeve; means for adjusting said sleeve axially to produce a bearing fit between the tapered surface thereof and the tapered recess of the table; and means for clamping said sleeve to the base in its vertically adjusted position.

2. The combination set forth in claim 1 in which means are provided between the said sleeve and base members for non-rotatably guiding said sleeve in its axial movement.

3. A hobbing machine work table comprising a base member; a hollow axle secured centrally in said base and projecting upwardly therefrom, the outer periphery of said projecting portion of the axle being slightly tapered toward its end; bearing surfaces on said base member circumscribing said axle; a hollow rotatable table member mounted upon the bearing surfaces of said base in overlying relation with the end of said axle; said table having an axially tapered recess formed in its under surface adapted to receive the projecting tapered end of said sleeve and to form a bearing thereon; means for adjusting said axle longitudinally relative to said base to produce a bearing fit between the tapered surface thereof and the tapered recess in the table; and means situated between the upper end surface of said axle and the overlying under surface of the table to prevent access of dirt or other foreign material to said bearing surfaces.

4. A hobbing machine work table comprising a base member; an axle member secured centrally in said base and projecting upwardly therefrom, the outer periphery of said upward projecting portion being slightly tapered toward its end; bearing surfaces on said base member circumscribing said axle; a rotatable table member mounted upon said bearing surfaces in overlying relation with the end of said axle, said table having an axially tapered recess formed in its under side adapted to receive the projecting tapered end of said sleeve; and interdigitating annular ribs formed upon said axle and table members for preventing access of dirt or other foreign material to said tapered surfaces.

5. A hobbing machine work table comprising a hollow base member; a non-rotatable but axially adjustable tubular axle mounted in said base and projecting upwardly therefrom, said projecting portion of the axle being formed with a gradual taper upon its external periphery; a rotatable table member overlying the projecting end of said axle, said table having a recess formed in its underside tapered complementally to the taper on said axle; separate vertical thrust bearing surfaces between said table and base members; and means provided by said base member arranged in overlying relation with a portion of the said table for holding the table in bearing relation with said separate bearing surfaces; and means to rotate said table about the said tubular axle.

6. A hobbing machine work table comprising a base member; an axially adjustable tubular axle mounted in said base and projecting upwardly therefrom, said projecting portion of the axle being formed with a gradual taper upon its external periphery; a rotatable table member overlying the projecting end of said axle, said table having a recess formed in its underside tapered complementally to the taper on said axle; means accessible from the inside of the axle for shifting the axle into bearing relation with said table; means for clamping said axle in adjusted position; and means to rotate said table angularly about the said tubular axle.

7. A hobbing machine work table comprising a hollow base member; a tubular axle mounted in said base and projecting upward therefrom, said projecting portion of the axle being formed with a gradual upwardly extending taper upon its external periphery; a rotatable table member overlying the projecting end of said axle, said table having a central aperture therein and a recess formed in its underside tapered complementally to the taper on said axle to afford a bearing therewith; additional bearing surfaces between said table and base members; means between said axle, table, and base members for excluding dirt from said bearing surfaces; separate means provided by said base member for holding the table in bearing relation on said bearing surfaces; and means to rotate said table about the said tubular axle.

8. A work table comprising a base member; a tubular axle mounted in said base and projecting upwardly therefrom, said projecting portion of the axle having an external bearing surface slightly tapering toward its upper end; an open-center rotatable table member mounted on said axle and overlying the annular end thereof, said table having a tapered recess in its underside larger than the central opening therein affording a bearing surface complemental to and co-acting with the tapered bearing surface of said axle for restraining the table against lateral movement; and additional bearing surfaces on said table and base members beginning at the peripheral surface of the axle and extending laterally in a plane substantially perpendicular to the axis of the axle for receiving the vertical thrusts to which the table is subjected.

WILLIAM F. ZIMMERMANN.